Feb. 16, 1954        J. W. LITTLE        2,669,360
ADJUSTABLE FILTER SCRAPER BLADE
Filed Nov. 29, 1951
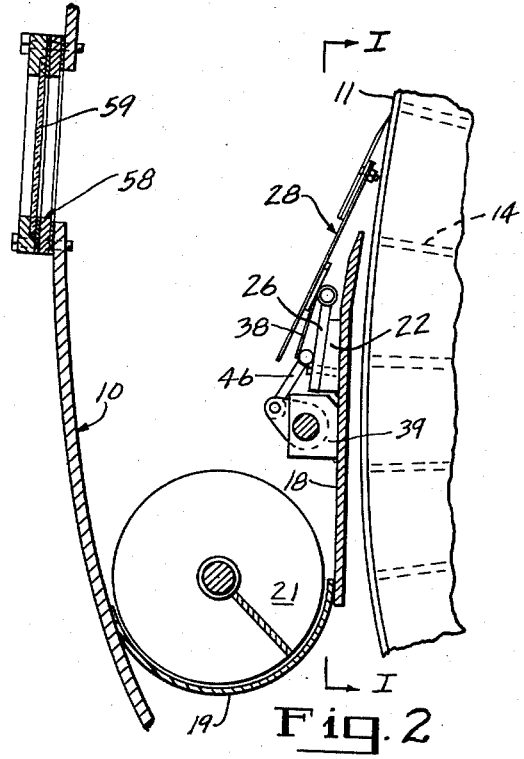
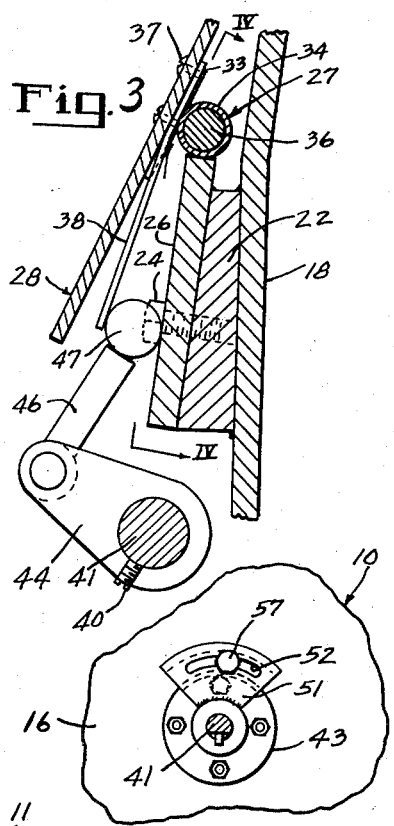
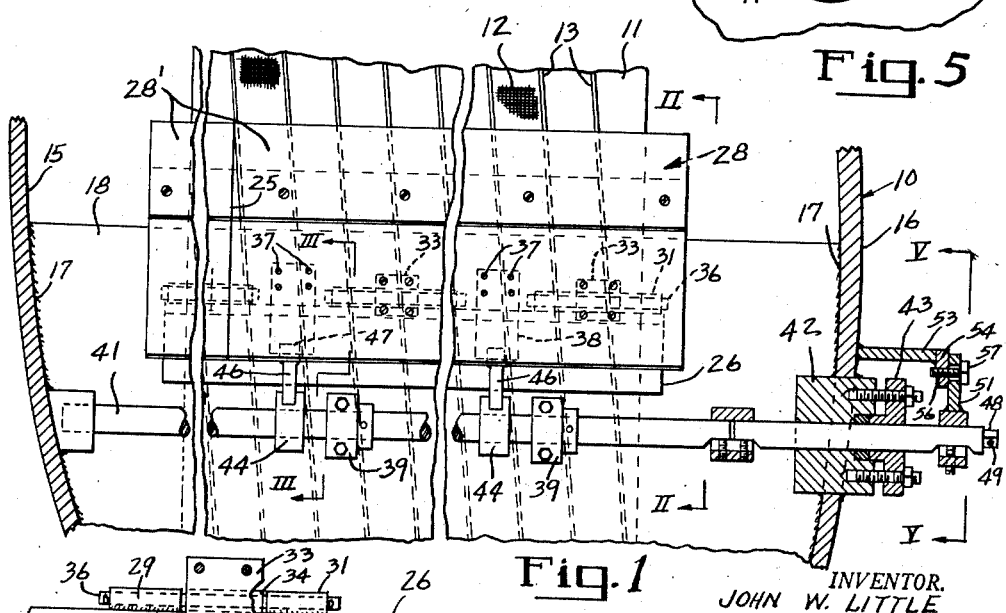
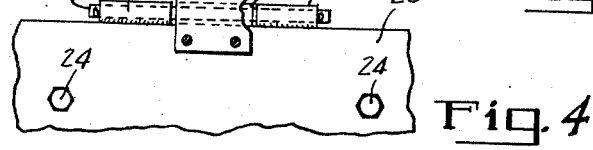
INVENTOR.
JOHN W. LITTLE
BY *Jennings & Carter*
ATTORNEYS Patented Feb. 16, 1954

2,669,360

UNITED STATES PATENT OFFICE 2,669,360

ADJUSTABLE FILTER SCRAPER BLADE

John W. Little, Birmingham, Ala., assignor to Goslin-Birmingham Manufacturing Company, Inc., a corporation of Alabama Application November 29, 1951, Serial No. 258,836

5 Claims. (Cl. 210—201)

This invention relates to an adjustable scraper blade for rotary filters and has for its principal object the provision of such a blade which shall be easily adjusted to the exact pressure required from the outside of the casing and while the filter is in operation.

Another object of my invention is to provide an adjustable scraper blade of the character designated which may be easily adjusted to cause the blade to bear against the surface of the filter drum sufficiently to remove the cake formed thereon and yet not bear hard enough to damage the filter cloth.

A more specific object of my invention is to provide an adjustable filter scraper blade which is especially adapted for use on filters employed in the solvent de-waxing of oil.

A still further object of my invention is to provide an adjustable filter scraper blade which shall be easily adjusted to bear against the surface of the filter drum with substantially uniform pressure from end to end by a single operation, thus eliminating the necessity of having to make several adjustments longitudinally of the blade every time the blade is adjusted.

Heretofore in the art to which my invention relates, the scraper blades have been adjusted on the drum by stopping the operation of the filter and, with a closed type filter removing the outer casing. The blade was then adjusted, by whatever means available, to what would appear to be the proper pressure. The casing was then closed and the filter put back in operation. Such an adjustment of the scraper blade has been unsatisfactory not only because it has entailed a shutting down of the filter in order to carry it out, but also it is very difficult to adjust the blade to the proper pressure while the filter is not in operation.

Also, when the filter is being used with propane or other volatile solvents it is necessary to stop operation of the filter, open it up and steam it out for several hours before one can get inside to adjust the blade.

It is very important in the operation of rotary filters that the flexible scraper blade bear against the surface of the filter drum with just sufficient pressure to remove the cake formed thereon. If the blade bears too hard against the surface, the wires which hold the cloth in place on the drum will wear the scraping edge of the blade, causing sharp edges which cut or damage the cloth.

An adjustable filter scraper blade embodying features of my invention is illustrated in the accompanying drawings forming a part of this application, in which:

Fig. 1 is a fragmentary front view, partly in section, taken along the line I—I of Fig. 2;

Fig. 2 is a view taken along line II—II of Fig. 1;

Fig. 3 is a view taken generally along the line III—III of Fig. 1;

Fig. 4 is a detail view taken along the line IV—IV of Fig. 3; and

Fig. 5 is a detail view taken along the line V—V of Fig. 1.

Referring now to the drawings for a better understanding of my invention I show a fragment of a rotary filter embodying a closed casing 10 and a cylindrical drum 11 which may be provided with any suitable filtering medium, such as cloth 12 held in place by wires 13 wound spirally about the drum. Also, the drum is provided with the usual partition walls 14 forming a plurality of compartments.

The casing 10 is provided with end walls 15 and 16 and extending between and secured to the end walls as by welding at 17 is a vertically extending partition wall 18 which is spaced from the drum 11, as shown in Fig. 2. Secured to the lower end of the wall 18 and to the inner wall of the casing 10 is a trough 19 having rotatably mounted therein a screw conveyor 21 for removing the material scraped from the drum 11.

Mounted on the wall 18 by any suitable means and extending substantially the length of the drum 11, is an upwardly tapered bar 22. Secured to the bar 22 by means of bolts 24 is a plate 26 which also extends substantially the length of the drum 11. While I show the bar 22 and the plate 26 as being separate, they may, if desired, be formed integrally.

Pivotally mounted at the top of the plate 26 by a hinge connection 27 is a scraper blade 28 which may be divided transversely as at 25 to form a plurality of sections 28' which may be individually adjusted with respect to each other. The over all length of the blade 28 is slightly greater than the length of the drum 11. The hinge connection 27 comprises spaced sleeve members 29 and 31 which are secured to the top of the plate 26 as by welding or other suitable means. Secured to the underside of the blade 28 and fitting between the spaced sleeve members 29 and 31 is a hinge member 33 which has a sleeve portion 34 fitting between the sleeves 29 and 31. Extending through the sleeves 29, 34 and 31 is a hinge pin 36, about which the scraper blade 28 is thus free to rock.

Mounted on the underside of the blade 28 by any suitable means such as screws 37 are a plurality of leaf springs 38. The leaf springs are spaced longitudinally along the scraper 28 at suitable intervals and are positioned between the hinge connections 27 as shown in Fig. 1.

Mounted on the wall 18 beneath the bar 22 and plate 26 are a plurality of bearings 39 for supporting a horizontally extending rotary shaft 41. The shaft 41 is substantially parallel to the axis of the drum 11 and extends from one end of the rotary filter to the other. One end of the shaft 41 extends outwardly of the outer casing 10 through a stuffing box 42 in the end wall 16. The stuffing box 42 is provided with a suitable packing gland 43 to prevent leakage outside of the casing 10. Adjustably mounted on the shaft 41, by any suitable means such as set screws 40, opposite each of the leaf springs 38 is a crank arm 44. Pivotally mounted at the free end of each crank arm 44 is a push rod 46.

Mounted at the outer end of each push rod 46 is a short piece of rod 47 which extends parallel to the shaft 41. Each rod 47 is disposed between its associated leaf spring 38 and the plate 26, whereby upon upward movement thereof the leaf spring 38 and the bottom of the blade 28 are urged away from the plate 26 and the scraping edge of the blade is urged toward the drum 11.

The outwardly projecting end of the shaft 41 is squared as at 48 and is provided with an opening 49 for receiving a suitable tool for turning it.

Keyed to the shaft 41 outwardly of the outer casing 10 is a bracket 51 having a quadrant slot 52 therein. Mounted on the outer wall of the casing 10 adjacent the shaft 41 is an outwardly projecting arm 53 having a downwardly extending portion 54 adjacent the bracket 51, as shown in Fig. 1. The downwardly extending portion 54 is provided with an internally threaded opening 56 opposite the slot 52, for receiving a screw 57. The screw 57 passes through the slot 52 and into the opening 56 thus providing means for locking the shaft and blade assembly at any desired position.

From the foregoing description, the operation of my adjustable filter scraper blade will be readily understood. When the blade is installed an initial adjustment may be necessary. This adjustment is made by loosening the set screws 40 and adjusting the individual crank arms 44 so as to position the entire scraping edge of all the sections 28' of the blade against the drum 11. This initial adjustment of the blade is very important for the reason that the surface of long drums and the scraping edges of the blades therefor are generally uneven, thus causing uneven pressure of the blade against the drum. By adjusting the individual crank arms, all points along the entire length of the blade bear with substantially the same pressure against the drum.

Filters of the class having a closed casing are usually provided with peep holes 58 having pressure tight glass covers 59 whereby the operation of the filter may be observed from the outside. In making the final adjustment of the blade, the operator looks through one of the peep holes 58 in the casing and turns the shaft 41 by a suitable tool at 48 or 49, as the case may be, so as to cause the rods 47 to move downwardly toward the lower end of the spring 38 thereby causing all sections 28' of the blade to be slacked off the surface of the drum. The blade is slacked off until some of the cake begins to pass under the blade, then the shaft 41 is rotated in the opposite direction to move the rods 47 upwardly between the leaf springs 38 and the plate 26 thus forcing the lower end of the leaf spring outwardly and causing the scraping edge of the blade 28 to bear against the drum 11 with sufficient pressure to remove the cake. The blade and shaft 41 are then locked in the adjusted position by tightening the screw 57.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. The combination with a rotary filter embodying a cylindrical filter drum and a closed casing therefor, together with a scraper blade pivotally mounted to bear against said drum, of an upwardly tapered plate mounted inwardly of said blade, a plurality of spaced apart leaf spring members each being secured at one end to the blade along the entire length thereof, the free ends of said spring members extending in a direction away from the scraping edge of said blade intermediate the blade and said plate, a movable member for each spring member in position to slidably engage between the free end of its associated spring member and said plate and urge the scraping edge of said blade toward said drum, a shaft extending through one end of said closed casing and operatively connected to each of said movable members for moving the same, and means outwardly of said casing for rotating said shaft.

2. The combination set forth in claim 1 in which the means for locking the shaft in selected positions comprises a bracket rigidly secured to the shaft outwardly of the closed casing, a bracket secured to the outer wall of said casing adjacent said first mentioned bracket and releasable means locking said brackets to each other in selected positions.

3. In a rotary drum filter having a pivoted scraper blade, a plurality of leaf springs disposed at intervals underneath the blade and along the length thereof, each of said springs having one end secured to the underside of the blade and the other extending freely at an angle away from the blade, means for adjusting the tension of said springs and thereby the pressure of the blade against the drum comprising an upwardly extending member mounted inwardly of said springs, a shaft extending alongside the drum longitudinally thereof, crank arms on the shaft, means for adjusting the individual crank arms on the shaft thereby causing the entire blade to bear with substantially uniform pressure against the drum, and push rods connected to the crank arms with the free ends thereof slidably fitting between said upwardly extending member and said springs.

4. An adjustable scraper for a rotary filter drum comprising an upwardly extending member mounted adjacent said drum, a scraper blade pivotally mounted adjacent the top of said member and adapted to bear against said drum, a plurality of spaced apart flexible members secured to the blade along the length thereof and having their free ends extending in a direction away from the scraping edge of said blade intermediate said blade and said upwardly extending member, a shaft rotatably mounted adjacently below said upwardly extending member and extending parallel to said drum, crank arms adjustably mounted on said shaft opposite each of said flexible members, push rods pivotally mounted to said crank arms with the free ends of each slidably fitting between its associated flexible member and said upwardly extending member and urging the scraping edge of said blade toward and away from said drum upon rotation of said shaft in opposite directions.

5. The combination with a rotary filter drum having a scraper blade divided transversely into a plurality of sections and pivotally mounted to bear against said drum, of an upwardly extending member mounted inwardly of said blade, a plurality of spaced apart flexible members disposed at intervals along the blade, each being secured at one end to the blade and with a free end extending away from the scraping edge of the blade intermediate the blade and said upwardly extending member, and a movable member for each flexible member in position to slidably engage between the free end of its associated flexible member and said upwardly extending member and urge the scraping edge of said blade toward said drum.

JOHN W. LITTLE.

References Cited in the file of this patent

UNITED STATES PATENTS

| Number | Name | Date |
| --- | --- | --- |
| 1,415,859 | Bates | May 16, 1922 |

FOREIGN PATENTS

| Number | Country | Date |
| --- | --- | --- |
| 176,619 | Great Britain | Mar. 16, 1922 |